US012629631B2

(12) United States Patent
Hermans

(10) Patent No.: US 12,629,631 B2
(45) Date of Patent: *May 19, 2026

(54) DEVICE AND METHOD FOR DRYING COMPRESSED GAS

(71) Applicant: ATLAS COPCO AIRPOWER, NAAMLOZE VENNOOTSCHAP, Wilrijk (BE)

(72) Inventor: Hans Maria Karel Hermans, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 727 days.

This patent is subject to a terminal disclaimer.

(21) Appl. No.: 17/873,443

(22) Filed: Jul. 26, 2022

(65) Prior Publication Data

US 2023/0042501 A1 Feb. 9, 2023

(30) Foreign Application Priority Data

Aug. 3, 2021 (BE) .................................. 2021/5615

(51) Int. Cl.
*B01D 53/26* (2006.01)
*B01D 53/04* (2006.01)

(52) U.S. Cl.
CPC ....... *B01D 53/261* (2013.01); *B01D 53/0438* (2013.01); *B01D 53/0446* (2013.01);
(Continued)

(58) Field of Classification Search
CPC .............. B01D 53/261; B01D 53/0438; B01D 53/0454; B01D 2259/402; B01D 2259/4009; B01D 2259/40003
See application file for complete search history.

(56) References Cited

U.S. PATENT DOCUMENTS 4,303,228 A * 12/1981 Snarski ................ C01B 21/045
266/97
2014/0260967 A1 9/2014 Gitschlag
(Continued)

FOREIGN PATENT DOCUMENTS

CA 3130096 A1 10/2020
CN 204911174 U 12/2015
(Continued)

OTHER PUBLICATIONS

BE Search Report and Written Opinion in corresponding BE Application No. 202105615, dated Apr. 2, 2022.
(Continued)

*Primary Examiner* — Robert Clemente
(74) *Attorney, Agent, or Firm* — BACON & THOMAS, PLLC

(57) ABSTRACT

Device for drying compressed gas having at least two vessels containing a regenerable drying agent and an controllable valve system with a first valve block and a second valve block. The device is further provided with a first regeneration line with heating means and a second regeneration line for discharging saturated regeneration gas. The regeneration lines are connected to a different valve block, wherein in the first regeneration line between a blow-off opening or blower and the heating means an additional vessel with a regenerable drying agent is incorporated.

15 Claims, 2 Drawing Sheets

(52) U.S. Cl.
CPC ...... *B01D 53/0454* (2013.01); *B01D 2257/80* (2013.01); *B01D 2259/40003* (2013.01); *B01D 2259/4009* (2013.01); *B01D 2259/402* (2013.01)

(56) References Cited

U.S. PATENT DOCUMENTS

| | | | |
|---|---|---|---|
| 2023/0001345 A1* | 1/2023 | Hermans ............ | B01D 53/0454 |
| 2023/0013311 A1* | 1/2023 | Hermans ............ | B01D 53/0454 |
| 2024/0335785 A1* | 10/2024 | Hermans ................ | F04B 39/16 |

FOREIGN PATENT DOCUMENTS

| | | | | |
|---|---|---|---|---|
| CN | 105688617 | A | | 6/2016 |
| CN | 205700061 | U | | 11/2016 |
| CN | 110508107 | A * | | 11/2019 |
| CN | 111298605 | A * | | 6/2020 |
| CN | 115382362 | A * | 11/2022 | ......... B01D 53/0438 |
| EP | 081141414 | A2 | | 10/1997 |
| EP | 0811414 | A2 * | | 12/1997 |
| EP | 3075433 | A1 | | 5/2016 |
| JP | 1986-204629 | U | | 12/1986 |
| JP | 62-155920 | A | | 7/1987 |
| JP | 1990-045128 | U | | 3/1990 |
| JP | H06-059380 | B2 | | 8/1994 |
| KR | 2002-0035376 | A | | 5/2002 |
| KR | 2017-0002122 | A | | 1/2017 |
| WO | WO2021137127 | A1 | | 7/2021 |

OTHER PUBLICATIONS

JP Office Action in corresponding JP Application No. 2022-124100, dated Aug. 17, 2023.

First Examination Report (FER) issued for corresponding Australian Appl. 211810 in Aug. 2023.

Extended Search Report (ESR) was issued for corresponding European Appl. EP22186955 in Oct. 2022.

Office action cited in corresponding Korean Patent Appln. No. 10-2022-0096077 on Feb. 12, 2026, with machine translation.

* cited by examiner

DEVICE AND METHOD FOR DRYING COMPRESSED GAS

The present invention relates to a device for drying compressed gas.

More specifically, the invention is intended to increase the efficiency of a device for drying a compressed gas, to make such device less dependent on the environmental parameters and more reliable.

BACKGROUND OF THE INVENTION

Devices for drying compressed gas are already known, which are provided with an inlet for compressed gas to be dried and an outlet for dried compressed gas, wherein the drying device comprises at least two vessels containing a regenerable drying agent and a controllable valve system consisting of a first valve block and a second valve block connecting said inlet and said outlet, respectively, to said vessels, wherein the controllable valve system is configured such that at least one vessel can dry compressed gas while the other vessel is being regenerated and cooled, and that by control of the valve system, the vessels each in turn can dry compressed gas.

By regenerable drying agent herein is meant a drying agent or desiccant which can absorb moisture from a gas by adsorption and which, when saturated with moisture, can be dried by passing a so-called regeneration gas through it.

This process is also known as drying agent regeneration. The regeneration gas is typically a hot gas.

Although the principle of adsorption is mentioned here, the invention is also applicable to the principle of absorption.

When a vessel will dry, it will absorb moisture from the compressed gas to be dried, saturating the drying agent. This means that it can absorb little or no additional moisture.

Subsequently, this vessel is then regenerated, wherein typically a hot gas, said regeneration gas, for example hot air, is passed through it. This hot gas will extract moisture from the drying agent and regenerate it.

Subsequently, the vessel can optionally be cooled first before being used again to dry compressed gas. After regeneration, the drying agent will have heated up. By first cooling the drying agent in a vessel before using this vessel again for drying, the drying agent will be able to extract moisture much more efficiently.

In order to be able to provide for the regeneration of a vessel, devices are already known which are provided with a first regeneration line that is provided with heating means, said regeneration line being provided for supplying a regeneration gas to the vessel that is being regenerated, wherein the first regeneration line connects to the second valve block, and with a second regeneration line for the discharge of saturated regeneration gas which connects to the first valve block, wherein the first and the second regeneration line, respectively, can be connected to the outlet of a blower or the like for the supply of ambient air, respectively to a blow-off opening or vice versa.

When a vessel is being regenerated, the first regeneration line will be connected to said blower and the second regeneration line to said blow-off opening.

Said blower will be able to supply ambient air which is heated by means of the above-mentioned heating means before being transferred via the second valve block to the vessel being regenerated.

After passing through the vessel that is being regenerated, the saturated regeneration air will leave the device via said second regeneration line and the blow-off opening.

Subsequently, this regenerated vessel is first cooled.

To this aim, the first regeneration line is connected to the blow-off opening and the second regeneration line to said blower.

The blower will now pass a cooling gas through the second regeneration line and then through the regenerated vessel, wherein the drying agent is cooled by means of the cooling gas.

This cooling gas will leave the device via the first regeneration line and the blow-off opening.

A drawback of such devices is that they require a relatively high temperature of the regeneration gas and thus of the heating means, such that they consume relatively much energy.

This is a result of the use of ambient air for regeneration, as a result of which this air will always contain moisture, such that the regeneration will not be optimal unless the ambient air is heated very strongly.

In addition, the device is dependent on the environmental parameters as ambient air is used for regeneration and cooling.

SUMMARY OF THE INVENTION

The present invention aims to provide a solution to at least one of the aforementioned and other drawbacks.

The present invention involves a device for drying compressed gas, which device is provided with an inlet for compressed gas to be dried and an outlet for dried compressed gas, wherein the drying device comprises at least two vessels containing a regenerable drying agent and a controllable valve system consisting of a first valve block and a second valve block connecting said inlet and said outlet, respectively, to said vessels, wherein the controllable valve system is configured such that at least one vessel can dry compressed gas, while the other vessel is being regenerated and cooled, and that, by controlling the valve system, the vessels can each in turn dry compressed gas, wherein the device is further provided with a first regeneration line provided with heating means for supplying a regeneration gas to the vessel which is being regenerated, and with a second regeneration line for the discharge of saturated regeneration gas, wherein the first and second regeneration lines are each connected to a different valve block, wherein the first and the second regeneration lines, respectively, can be connected to a blow-off opening, respectively to an outlet of a blower or the like for the supply of ambient air, or vice versa, characterized in that in the first regeneration line between the blow-off opening or blower and said heating means an additional vessel is incorporated which contains a regenerable drying agent.

An advantage is that, during regeneration of the relevant vessel that is being regenerated, the ambient air will pass through the additional vessel before being heated up.

All ambient moisture will be extracted by the drying agent in the additional vessel such that regeneration can be done using this completely dry ambient air. This will ensure a more efficient regeneration.

An additional advantage of this is that the ambient air has to be heated less strongly, such that the heating means can be set at a lower temperature and at least temporarily use a smaller power.

Typically, this will be, for example, a reduction of 30 to 40° C. relative to the known devices.

It is therefore also possible to provide more compact heating means, since less heating capacity will be required.

Another advantage is that, when the regenerated vessel is subsequently cooled, the heat from that regenerated vessel will be transported via the cooling gas to the additional vessel, and the drying agent in the additional vessel will regenerate in the process.

Moreover, the heat will, as it were, be temporarily stored in this additional vessel, meaning that the additional vessel is heated.

When a vessel is regenerated during a subsequent cycle, the ambient air drawn in by the blower will not only be dried by the additional vessel, but will also be heated up for a certain time. Moreover, in this additional vessel, heat will be released through adsorption. This is also called 'heat of adsorption' and is comparable to heat of condensation.

Typically, this will amount to, for example, an increase of 10° C. relative to the known devices.

For clarity, it is explicitly stated here that it is possible that the drying agent in the additional vessel is the same drying agent as in the at least two vessels of the device, but it may also be a different drying agent.

According to a preferred feature of the invention, the internal volume of the additional vessel is smaller than the internal volumes of each of said at least two vessels.

This will ensure that the entire volume of drying agent in the additional vessel is always fully regenerated during cooling, thus preventing any moisture remaining in the additional vessel at the start of the regeneration process.

In a practical embodiment, the additional vessel is thermally insulated.

This thermal insulation may, for example, take the form of an insulating coating on the inside and/or outside of the additional vessel and/or of a layer of insulating material with which the additional vessel is packed.

An advantage of this is that the heat ending up temporarily in the additional vessel during the cooling phase is stored as optimally as possible.

The invention also relates to a method of drying compressed gas, wherein the method comprises the step of passing the compressed gas to be dried through a first regenerable drying agent to extract moisture from the gas to be dried, thereby saturating the first drying agent with the extracted moisture, wherein the method further comprises the step of regenerating the saturated first drying agent by passing a regeneration gas therethrough, characterized in that dried and heated ambient air is used as the regeneration gas.

The advantages of such a method are analogous to those described above for the device. By also drying the regeneration gas, in addition to just heating, the regeneration of the first drying agent can be done much more efficiently, allowing the temperature of this regeneration gas to be lower compared to the existing methods, without compromising on the efficiency of the regeneration process.

Preferably, to dry said ambient air, the ambient air is passed through a second drying agent before being passed through the saturated first drying agent, wherein the second drying agent is being saturated with the extracted moisture from the ambient air.

Preferably, the method further comprises the step of cooling the regenerated first drying agent by passing ambient air therethrough, wherein the ambient air is heated, and wherein the method further comprises the step of passing this heated ambient air through the saturated second drying agent to regenerate the second drying agent.

In a practical embodiment, a device according to the invention is used for carrying out the method.

BRIEF DESCRIPTION OF THE DRAWINGS

In order to better demonstrate the features of the invention, some preferred embodiments of a device and method for drying compressed gas according to the invention are described below, by way of example without any limiting character, with reference to the accompanying drawings, in which.

DETAILED DESCRIPTION OF THE INVENTION

Figure 1:
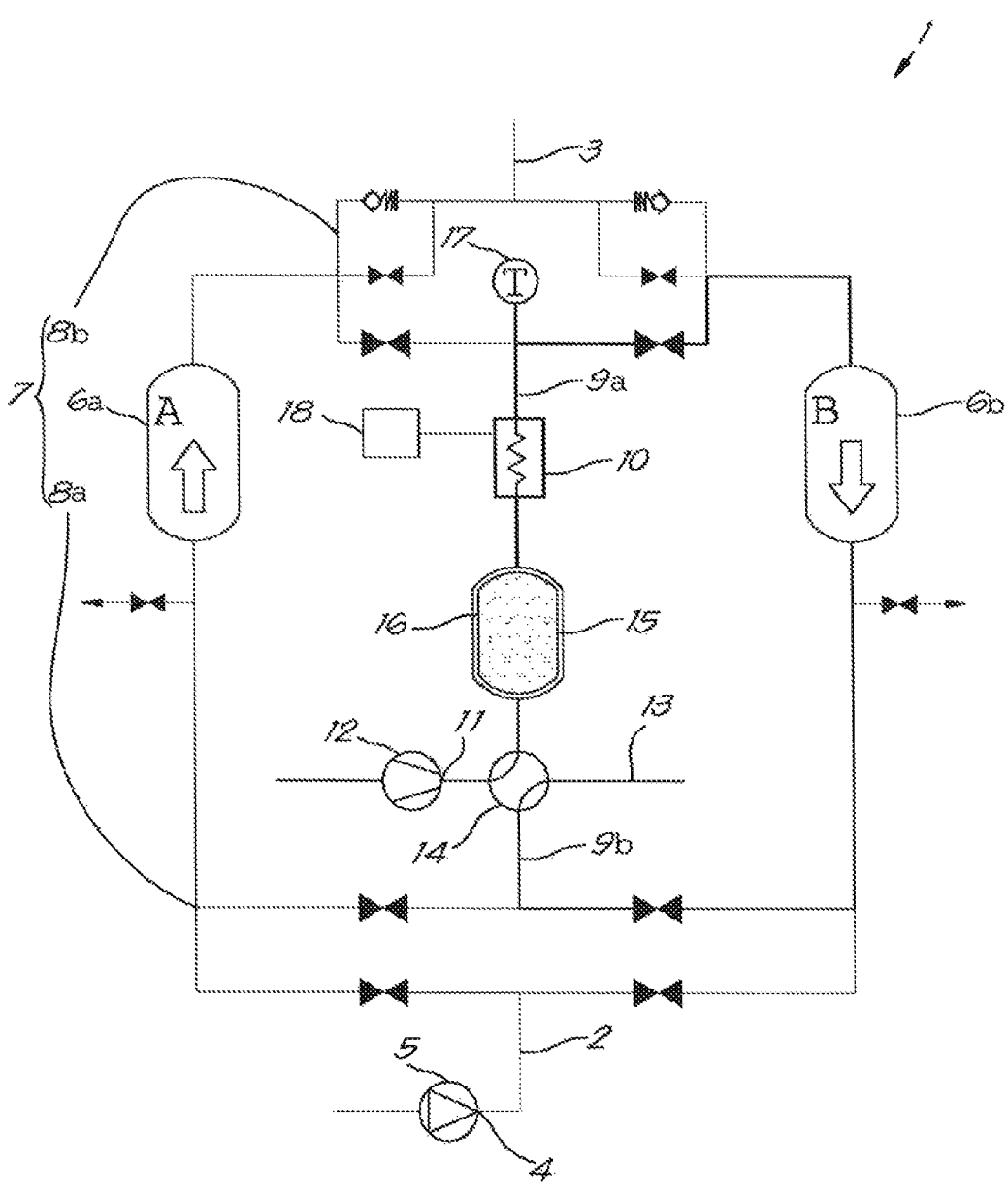
FIG. 1 schematically represents a device according to the invention for drying compressed gas.

The device for drying compressed gas 1, shown in FIG. 1, comprises an inlet 2 for compressed gas to be dried and an outlet 3 for dried compressed gas.

In the example of FIG. 1, the inlet 2 is connected to the outlet 4 of a compressor 5.

The device 1 further comprises two vessels 6a, 6b containing a regenerable drying agent.

It is not excluded for the invention that the device 1 contains more than two such vessels 6a, 6b.

Furthermore, the device 1 comprises a controllable valve system 7 consisting of a first valve block 8a and a second valve block 8b.

The first valve block 8a will connect the vessels 6a, 6b to said inlet 2 for compressed gas to be dried, while the second valve block 8b will connect the vessels 6a, 6b to said outlet 3 for dried compressed gas.

Said valve blocks 8a, 8b are a system of different pipes and valves which can be controlled in such a way that at least one vessel 6a, 6b is regenerated and subsequently cooled, while the other vessel 6a, 6b or the other vessels 6a, 6b dry the compressed gas, whereby by controlling the valve system 7 the vessels 6a, 6b each in turn will dry compressed gas.

According to the invention, the device 1 further comprises a first regeneration line 9a for supplying a regeneration gas to the vessel 6a, 6b being regenerated and a second regeneration line 9b for discharging saturated regeneration gas.

The first and second regeneration lines 9a, 9b are each connected to a different valve block 8a, 8b.

In the example shown in FIG. 1, the first regeneration line 9a is connected to the second valve block 8b and the second regeneration line 9b is connected to the first valve block 8a, but this could also be the other way around.

Heating means 10 are incorporated into the first regeneration line 9a in order to be able to heat up the regeneration gas before entering and flowing through the vessel 6a, 6b being regenerated.

In this case, these heating means 10 comprise an electrical heating system, but it is not excluded that they comprise a steam heater or a heat exchanger incorporated in the first regeneration line 9a.

The heating means 10 may also comprise a heat exchanger which uses the heat of compression of the compressor 5 to heat up the regeneration gas.

Both the first and the second regeneration line 9a, 9b can be connected to an outlet 11 of a blower 12 or to a blow-off opening 13.

The blower 12 serves to be able to draw in ambient air. It is of course not excluded that, instead of a blower 12, other means are provided for drawing in ambient air.

Either the first regeneration line 9a is connected to an outlet 11 of a blower 12 and the second 9b to a blow-off opening 13 or vice versa, meaning that the second regeneration line 9b is connected to an outlet 11 of a blower 12 and the first regeneration line 9a to a blow-off opening 13.

Although it is possible to provide a blower 12 and a blow-off opening 13 for each regeneration line 9a, 9b and switching means for switching between the two, in the example of FIG. 1 it has been chosen to operate via a valve device in the form of a four-way valve 14. in order to achieve a more compact design.

However, such a compact valve device does not necessarily have to be equipped with a four-way valve 14.

The valve device preferably comprises one or more of the following components:

four-way valve (14);
three-way valve;
butterfly valve;
on/off valve.

The valve device may, for example, consist of four separate butterfly valves, four separate on/off valves or two three-way valves.

Via the four-way valve 14, the first and second regeneration lines 9a, 9b, respectively, can be connected to the outlet 11 of the blower 12, respectively to the blow-off opening 13, or vice versa.

To this end, one connection point of the four-way valve 14 is connected to the first regeneration line 9a, one connection point to the second regeneration line 9b, one connection point to the blow-off opening 13, and one connection point to the outlet 11 of the blower 12.

By switching the four-way valve 14, it is possible to select which of the two regeneration lines 9a, 9b is connected to the outlet 11 of the blower 12 and which to the blow-off opening 13.

FIG. 1 shows the situation of a first position of the four-way valve 14, wherein the first regeneration line 9a is connected to the outlet 11 of the blower 12.

The device 1 is such that in this position of the four-way valve 14, the ambient air drawn in by the blower 12 can end up in the vessel 6b that is being regenerated via the four-way valve 14, the first regeneration line 9a and the second valve block 8b.

Of course, the valve system 7 is hereby appropriately controlled to enable the correct flow path for the ambient air.

Figure 2:
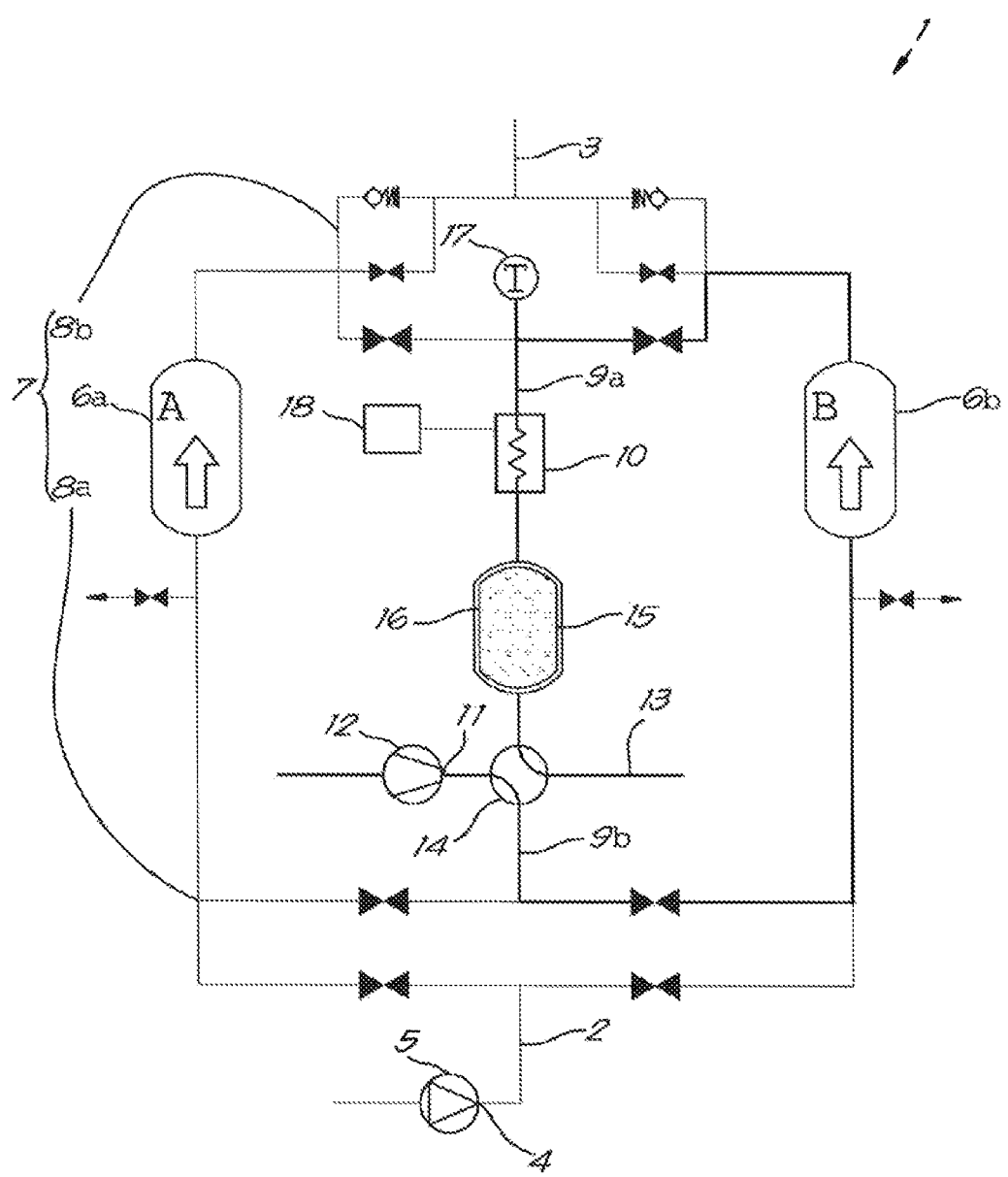
FIG. 2 represents the device of FIG. 1, but in a different position.

FIG. 2 shows the situation of a second position of the four-way valve 14, wherein the first regeneration line 9a is connected to the blow-off opening 13.

The device 1 is such that, in this position of the four-way valve 14, the ambient air drawn in by the blower 12 can enter via the four-way valve 14, the second regeneration line 9b and the first valve block 8a, the vessel 6b which is being cooled.

Also, hereby the valve system 7 is appropriately controlled to allow the correct flow path for the ambient air.

It is also not excluded that, instead of a four-way valve 14, use is made of a valve block with, for example, four valves or of other means which can realize the same configuration as the four-way valve 14.

According to the invention, an additional vessel 15 is incorporated in the first regeneration line 9a between the blow-off opening 13 or the blower 12 and the above-mentioned heating means 10.

This additional vessel 15 also contains a regenerable drying agent.

In this case and preferably, this is a water-resistant drying agent, such as, for example, silica gel or activated aluminium oxide (activated alumina).

This has the advantage that, if condensate should occur in the additional vessel 15, this has no influence or impact on the drying agent.

In this case, the additional vessel 15 is, for example, manufactured by means of an extrusion, for example from aluminium. The additional vessel may also be a tube, for example, in particular a steel tube.

Since no compressed gas enters the additional vessel 15, this additional vessel 15 must not be a pressure vessel, but it is not excluded that the additional vessel 15 is a pressure vessel.

Also, in this case, the additional vessel 15 is packed in an insulating material 16 to thermally insulate the additional vessel.

Alternatively, it is also possible to thermally insulate the additional vessel 15 by means of an insulating coating on the inside and/or on the outside of the additional vessel 15.

The internal volume of the additional vessel 15 is preferably smaller than the internal volume of each of the vessels 6a, 6b, whereby also the amount of drying agent in the additional vessel 15 is smaller than the amount of drying agent in one of the vessels 6a, 6b.

Preferably, the internal volume of the additional vessel 15 is at most $\frac{1}{3}$, or more preferably $\frac{1}{4}$ of the internal volume of one of said two vessels 6a, 6b.

The preferred maximum dimensions of the additional vessel 15 will depend on the expected environmental parameters. If the relative humidity is 100%, the internal volume of the additional vessel 15 is preferably $\frac{1}{3}$ of the internal volume of said vessels 6a, 6b.

If the relative humidity is 70%, the internal volume of additional vessel 15 is preferably $\frac{1}{4}$ of the internal volume of said vessels 6a, 6b.

In this case, the device 1 is also provided with a temperature sensor 17, configured to measure the temperature at a location between the electric heater 10 and the inlet of the vessel 6a, 6b being regenerated. Note that by 'inlet of the vessel 6a, 6b being regenerated' herein is meant the side of the vessel 6a, 6b where the regeneration gas enters the vessel.

In the example of FIG. 1, this temperature sensor 17 is provided in the first regeneration line 9a, between the electric heating 10 and the second valve block 8a.

This location has the advantage that only one temperature sensor 17 has to be provided. However, it is also possible to alternatively provide a temperature sensor 17 at each said inlet of the vessel 6a, 6b.

In the example of FIG. 1, the temperature sensor 17 is arranged between the heating means 10 and the second valve block 8b, but this is not necessary.

Finally, the device 1 in this example is provided with a control unit 18 for controlling the heating means 10 based on the temperature measured by the temperature sensor 17.

To this end, the control unit 1 is connected to the temperature sensor 17 and the heating means 10.

The operation of the compressed gas drying device 1 is very simple and as follows.

During the operation of the device 1, through the inlet 2 and through the appropriate control of the valve system 7, compressed gas to be dried will enter the vessel 6a which is in the process of drying.

In the example of FIGS. 1 and 2, the left-hand vessel 6a will dry compressed gas.

When passing through this left-hand vessel 6a, the drying agent will extract moisture from the gas.

The dried compressed gas will leave the device 1 via the outlet 3.

By appropriate control of the valve system 7, the correct flow path for the compressed gas to be dried is realized.

The other, in this case the right-hand, vessel 6b, which has already dried gas during a previous cycle or phase, contains moisture and is being regenerated in the meantime.

Use is made herein of a regeneration cycle, which consists in heating ambient air and passing it through the relevant vessel 6b and then blowing it off.

To this end, the four-way valve 14 is switched in the first position, as shown in FIG. 1.

The blower 12 will draw in ambient air which enters the additional vessel 15 via the four-way valve 14.

Here, the ambient air will be dried and subsequently heated by the heating means 10.

Based on the measured temperature of the ambient air leaving the additional vessel 15, the control unit 18 will control the heating means 10 appropriately such that the ambient air has the desired temperature in order to be able to regenerate the relevant vessel 6b.

The control unit 18 will hereby take into account the fact that the ambient air has been dried, such that the ambient air will be able to dry much more efficiently, such that the temperature does not have to be set so high compared to non-dried ambient air.

The dried, heated ambient air will now be conducted via the second valve block 8b to the right-hand vessel 6b in order to regenerate the drying agent in this vessel 6b.

After passing through the vessel 6b, the drying agent in that vessel 6b will not only be dried but also heated.

The ambient air will then leave the device 1 via the first valve block 8a, the four-way valve 14 and the blow-off opening 13.

Now, the right-hand vessel 6b has been regenerated, meaning that the moisture has been removed from the drying agent and has been heated up.

In order to ensure that this vessel 6b can optimally dry compressed gas during a next cycle or step, it is first cooled.

After all, cold drying agent dries better than hot drying agent.

To this end, the four-way valve 14 is switched to the second position, as shown in FIG. 2.

The state or position of the valve system 7 is not changed, such that meanwhile the left-hand vessel 6a can still dry compressed gas.

By switching over the four-way valve 14, the ambient air, drawn in by the blower 12, will now reach the vessel 6b via the first valve block 8a and dissipate the heat from this vessel 6b.

Via the second valve block 8b and the heating 10, the now heated ambient air ends up in the additional vessel 15.

Note that the control unit 18 has switched off the heating means 10 at the latest at the start of the cooling.

The heated ambient air will now regenerate the additional vessel 15, meaning that the moisture taken up in the previous step from the ambient air is extracted from the additional vessel 15, and will also heat up the drying agent.

As a result of this process, the right-hand vessel 6b will be cooled and the additional vessel 15 will be regenerated and heated.

Due to the insulation 16 provided, all this heat will be optimally stored in the additional vessel 15.

At the end of this cooling step, the drying agent in the left-hand vessel 6a will be saturated and this vessel will be ready to be regenerated, while the right-hand vessel 6b is now ready to dry compressed gas.

By controlling or switching the valve system 7, it will now be ensured that the compressed gas to be dried ends up in the right-hand vessel 6b to be dried.

Meanwhile, the left-hand vessel 6a will be regenerated in the same manner as in the previous step.

The four-way valve 14 will hereby be returned to the first position, as shown in FIG. 1.

The blower 12 will draw in ambient air which will end up in the additional vessel 15.

Here, the ambient air will not only be dried, but also at least partially heated.

As a result, dried and already preheated ambient air will end up in the heating means 10 via the first regeneration line 9a.

The control unit 18 will control the heating means 10 based on the temperature sensor 17.

Since the ambient air has already been preheated, the heating means 10 will have to be set less high, with the result that the maximum temperature that the heating means 10 must supply, will be less high.

Furthermore, the regeneration and subsequent cooling of this vessel 6a proceeds analogously to that described above for the right-hand vessel 6b.

After cooling the left-hand vessel 6a, the right-hand vessel 6b will be saturated and the vessels can be exchanged again.

The entire cycle then repeats itself from the beginning.

Although in the example shown and described, there are only two vessels 6a, 6b, it cannot be ruled out that there are more than two vessels 6a, 6b, in which case at least one vessel 6a, 6b will always dry compressed gas.

For example, there may be six vessels 6a, 6b, of which three vessels 6a, 6b will dry compressed gas, two vessels 6a, 6b will be regenerated and one vessel 6a, 6b will be cooled.

Although the temperature sensor 17 in the illustrated example is located after the heating means 10, it cannot be ruled out that the temperature sensor is located elsewhere in the regeneration line.

The present invention is by no means limited to the embodiments described by way of example and shown in the figures, but a device and method for drying compressed gas according to the invention can be realized in all kinds of variants without departing from the scope of the invention.

The invention claimed is:

1. A device for drying compressed gas, which device is provided with an inlet for compressed gas to be dried and an outlet for dried compressed gas, wherein the device has a controllable valve system and at least two vessels respectively containing first and second regenerable drying agents, comprising:

a first valve block and a second valve block connecting said inlet and said outlet, respectively, to said vessels, wherein the controllable valve system is configured such that at least one vessel dries the compressed gas while the other vessel is being regenerated and cooled, and that, by controlling the valve system, the vessels each in turn dry the compressed gas, wherein the device is further provided with a first regeneration line provided with heating means for supplying a regeneration gas to the one of the two vessels which is being regenerated, and with a second regeneration line for the discharge of saturated regeneration gas from the respective one of the two vessels that is being regenerated, wherein the first and the second regeneration lines are each connected to a different valve block, wherein the first and the second regeneration line are configured to be respectively connected to a blow-off opening for discharging the saturated regeneration gas from the respective one of the at least two vessels that is being regenerated, and to an outlet of a blower for the supply of ambient air to the first regeneration line in order to heat the ambient air and supply it as the regeneration gas to the respective at least two vessels that is being regenerated, or vice versa, wherein the first regeneration line incorporates an additional vessel between the blow-off opening or blower and said heating means, and wherein the additional vessel contains an additional regenerable drying agent for drying the ambient air supplied from the output of the blower to the heating means, thereby drying the regeneration gas supplied to the respective one of the two vessels that is being regenerated.

2. The device according to claim 1, wherein a water-resistant drying agent is arranged in the additional vessel.

3. The device according to claim 1, wherein the additional vessel has a smaller internal volume than the internal volume of each of said at least two vessels.

4. The device according to claim 3, wherein the internal volume of the additional vessel is at most ⅓ of the internal volume of one of said at least two vessels.

5. The device according to claim 4, wherein the internal volume of the additional vessel is at most ¼ of the internal volume of one of said at least two vessels.

6. The device according to claim 1, wherein the additional vessel is made by means of extrusion or a tube.

7. The device according to claim 1, wherein the additional vessel is thermally insulated.

8. The device according to claim 1, further including a valve device in communication with said regeneration lines and configured such that the valve device is able to respectively connect the first and second regeneration lines with the outlet of the blower and the blow-off opening, or vice versa.

9. The device according to claim 8, wherein the valve device comprises one or more of the following:

a four-way valve;
a three-way valve;
a butterfly valve; and
an on/off valve.

10. The device according to claim 1, wherein the first regeneration line is connected to the second valve block and the second regeneration line to the first valve block.

11. The device according to claim 1, wherein the device is provided with a temperature sensor at a location between the heating means and the at least two vessels.

12. The device according to claim 11, wherein the device is provided with a control unit for controlling the heating means based on the temperature measured by the temperature sensor.

13. The device according to claim 1, wherein said heating means with which the first regeneration line is provided includes an electric heater, a steam heater, or a heat exchanger incorporated in the first regeneration line.

14. A method of drying compressed gas, wherein the method comprises the steps of:

compressing a gas in a compressor and passing the compressed gas through a first vessel containing a first regenerable drying agent to extract moisture from the gas to be dried, thereby saturating the first drying agent with the extracted moisture, supplying the compressed gas to a second vessel containing a second regenerable drying agent while shutting off supply of the compressed gas to the first vessel and instead supplying a regeneration gas to the first vessel, heating ambient air to be supplied to the first vessel as the regeneration gas, before heating the ambient air, drying the ambient air, and regenerating the saturated first drying agent by passing the regeneration gas therethrough, wherein ambient air is both dried and heated before being used as the regeneration gas, wherein in order to dry said ambient air, this ambient gas is passed through an additional vessel containing an additional regenerable drying agent before being heated and passed through the saturated first drying agent to regenerate said first drying agent, and wherein the method further comprises the steps of:

cooling the regenerated first drying agent by passing ambient air therethrough, wherein the ambient air is heated, and passing the heated ambient air through the additional regenerable drying agent to regenerate the additional regenerable drying agent.

15. The method according to claim 14, wherein a device is used for carrying out the method, wherein said device is provided with an inlet for compressed gas to be dried and an outlet for dried compressed gas, wherein the device has a controllable valve system and at least two vessels respectively containing first and second regenerable drying agents, comprising:

a first valve block and a second valve block connecting said inlet and said outlet, respectively, to said vessels, wherein the controllable valve system is configured such that at least one vessel dries the compressed gas while the other vessel is being regenerated and cooled, and that, by controlling the valve system, the vessels each in turn dry the compressed gas, wherein the device is further provided with a first regeneration line provided with heating means for supplying a regeneration gas to the one of the two vessels which is being regenerated, and with a second regeneration line for the discharge of saturated regeneration gas from the respective one of the two vessels that is being regenerated, wherein the first and the second regeneration lines are each connected to a different valve block, wherein the first and the second regeneration line are configured to be respectively connected to a blow-off opening for discharging the saturated regeneration gas from the respective one of the at least two vessels that is being regenerated, and to an outlet of a blower for the supply of ambient air to the first regeneration line in order to heat the ambient air and supply it as the regeneration gas to the respective at least two vessels that is being regenerated, or vice versa, wherein the first regeneration line incorporates an additional vessel between the blow-off opening or blower and said heating means, and wherein the additional vessel contains an additional regenerable drying agent for drying the ambient air supplied from the output of the blower to the heating means, thereby drying the regeneration gas supplied to the respective one of the two vessels that is being regenerated.

\* \* \* \* \*